US012742135B2

(12) United States Patent
Adams et al.

(10) Patent No.: US 12,742,135 B2
(45) Date of Patent: Sep. 22, 2026

(54) FOAM FORMULATIONS

(71) Applicant: Medivators Inc., Minneapolis, MN (US)

(72) Inventors: Heather Adams, Minneapolis, MN (US); Kham Moua, Minneapolis, MN (US)

(73) Assignee: Medivators Inc., Minneapolis, MN (US)

( * ) Notice: Subject to any disclaimer, the term of this patent is extended or adjusted under 35 U.S.C. 154(b) by 291 days.

(21) Appl. No.: 18/576,222

(22) PCT Filed: Jul. 19, 2022

(86) PCT No.: PCT/US2022/073865
§ 371 (c)(1),
(2) Date: Jan. 3, 2024

(87) PCT Pub. No.: WO2023/004297
PCT Pub. Date: Jan. 26, 2023

(65) Prior Publication Data

US 2024/0318099 A1 Sep. 26, 2024

Related U.S. Application Data

(60) Provisional application No. 63/223,627, filed on Jul. 20, 2021.

(51) Int. Cl.
*C11D 1/62* (2006.01)
*B08B 3/04* (2006.01)
(Continued)

(52) U.S. Cl.
CPC .......... *C11D 3/0094* (2013.01); *C11D 3/0036* (2013.01); *C11D 3/0084* (2013.01);
(Continued)

(58) Field of Classification Search
CPC .. C11D 1/62; C11D 1/662; C11D 1/72; C11D 1/722; C11D 1/835; C11D 3/0084;
(Continued)

(56) References Cited

U.S. PATENT DOCUMENTS 10,662,396 B2 5/2020 Man et al.
2007/0231197 A1 10/2007 Lin et al.
(Continued)

FOREIGN PATENT DOCUMENTS

WO 2017070917 A1 5/2017
WO 2019177925 A1 9/2019
WO WO 2020/096890 * 5/2020 ............... B08B 3/00

OTHER PUBLICATIONS

International Preliminary Report on Patentability dated Feb. 1, 2024, of International PCT Application No. PCT/US2022/73865 filed Jul. 19, 2022.
(Continued)

*Primary Examiner* — Brian P Mruk

(57) ABSTRACT

The invention describes foamable compositions that do not require a propellant for delivery that are useful to treat and moisten soiled medical instruments until final cleaning can be undertaken.

17 Claims, 7 Drawing Sheets

(51) Int. Cl.

| | |
|---|---|
| ***C11D 1/72*** | (2006.01) |
| ***C11D 1/722*** | (2006.01) |
| ***C11D 1/835*** | (2006.01) |
| ***C11D 3/00*** | (2006.01) |
| ***C11D 3/22*** | (2006.01) |
| ***C11D 3/37*** | (2006.01) |
| ***C11D 3/386*** | (2006.01) |

(52) U.S. Cl.
CPC ............ *C11D 3/3707* (2013.01); *C11D 3/386* (2013.01); *C11D 2111/20* (2024.01); *C11D 2111/42* (2024.01)

(58) Field of Classification Search
CPC ....... C11D 3/0094; C11D 3/042; C11D 3/044; C11D 3/2013; C11D 3/2068; C11D 3/2086; C11D 3/22; C11D 3/3707; C11D 3/386; B08B 3/04
See application file for complete search history.

(56) References Cited

U.S. PATENT DOCUMENTS

| | | | |
|---|---|---|---|
| 2011/0008266 | A1 | 1/2011 | Tamarkin et al. |
| 2019/0093050 | A1 | 3/2019 | Man et al. |
| 2020/0129402 | A1 | 4/2020 | Jamadagni et al. |

OTHER PUBLICATIONS

International Search Report and Written Opinion of the International Searching Authority Dated Sep. 23, 2022, of International PCT Application No. PCT/US2022/73865 filed Jul. 19, 2022.

* cited by examiner

FOAM FORMULATIONS

CROSS REFERENCE TO RELATED APPLICATIONS

This application claims priority to U.S. Provisional Patent Application Ser. No. 63/223,627 filed Jul. 20, 2021, which is incorporated herein by reference, in its entirety.

FIELD OF THE INVENTION

The invention relates generally to foamable compositions that do not require a propellant for delivery that are useful to treat and moisten soiled medical instruments until final cleaning can be undertaken.

BACKGROUND OF THE INVENTION

Medical devices, such as endoscopes, designed to come into contact with the body of a patient during treatment and or diagnosis require, before being re-used on a new patient, to be "reprocessed", so that the device can be used without concern for patient safety, infection and death resulting from remaining body fluid(s), body waste(s), virus(es) and or bacteria.

Such a sanitation treatment can be a simple disinfection or a sterilization process, performed at either hot or cold temperatures depending on the construction materials of the device. Various cleaning solutions can be used to accomplish the sanitation.

Often times the operator cannot clean the medical device immediately after use and sets it aside until time permits proper cleaning. If the medical procedure is at the end of the day or the end of the week, the soiled device may remain uncleaned for up to 72 hours. It is not advisable to have residue from a medical procedure dry on the medical device surfaces lest robust cleaning would be required and could lead to a issues with decontamination of the device.

Therefore, a need exists for a solution that overcomes one or more of the current disadvantages noted above.

BRIEF SUMMARY OF THE INVENTION

The present embodiments surprisingly provide simple and efficient foamable compositions that can be sprayed onto a soiled medical device wherein the foam remains coated to the surfaces of the medical device for at least 72 hours. The foamed composition prevents the remnants from a medical procedure from drying on the surface of the soiled medical device and allows an operator the ability to clean the device when time permits. Additionally, the foamed composition help to moisten the soiled medical device.

Advantageously, the foamable compositions described herein do not require the use of a propellant to expel the composition onto a soiled medical device. The composition can be delivered via a hand spray bottle, hand foaming device or other suitable/foam spray devices without the need for a propellant.

The foamable compositions include a polyoxyethylene-polyoxypropylene glycol; an ethoxylated C16-C18 alcohol; a C16-C18 alkyl alcohol; a chelator, such as ethylene diamine tetraacetic acid tetrasodium salt; an alpha hydroxy acid or a beta hydroxy acid, such as lactic acid or citric acid; an alkali metal hydroxide, such as sodium hydroxide; a C8/C10 alkyl polyglycoside; an alkyoxylated alcohol, such as Alkadet 20; a quaternary ammonium compound, such as benzalkonium chloride; a glycol ether, such as diethylene glycol monomethyl ether with the remainder being water.

The foamed compositions retain at least 60% to 70%, e.g., 61% to 69% or 62% to 68% or 63% to 67%, or 64% to 66% of their foam characteristics over a 72 hour period.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

Figure 1:
FIG. 1 provides pictures of foams at 0 hour, from left to right: Intercept detergent discharged from pressurized canister. Intercept detergent solution (control), L44 5% solution hand sprayed and L44 10% solution hand sprayed, all left uncovered at zero hours.

In the specification and in the claims, the terms "including" and "comprising" are open-ended terms and should be interpreted to mean "including, but not limited to . . . " These terms encompass the more restrictive terms "consisting essentially of" and "consisting of."

It must be noted that as used herein and in the appended claims, the singular forms “a”, “an”, and “the” include plural reference unless the context clearly dictates otherwise. As well, the terms “a” (or “an”), “one or more” and “at least one” can be used interchangeably herein. It is also to be noted that the terms “comprising”, “including”, “characterized by” and “having” can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

As used herein, “medical device” refers to an instrument, apparatus, implant, in vitro reagent, or similar or related article that is used to diagnose, prevent, or treat disease or other conditions, and does not achieve its purposes through chemical action within or on the body (which would make it a drug). Whereas medicinal products (also called pharmaceuticals) achieve their principal action by pharmacological, metabolic or immunological means, medical devices act by other means like physical, mechanical, or thermal means. Medical devices vary greatly in complexity and application. Examples range from simple devices such as tongue depressors, medical thermometers, and disposable gloves to advanced devices such as computers which assist in the conduct of medical testing, implants, and prostheses. The design of medical devices constitutes a major segment of the field of biomedical engineering. In specific embodiments, the medical device can include an endoscope (e.g., flexible endoscope).

As used herein, “endoscope” refers to an instrument used to examine the interior of a hollow organ or cavity of the body. Unlike most other medical imaging devices, endoscopes are inserted directly into the organ. Endoscope can also refer to using a borescope in technical situations where direct line of-sight observation is not feasible.

An endoscope can consist of: (a) a rigid or flexible tube; (b) a light delivery system to illuminate the organ or object under inspection. The light source is normally outside the body and the light is typically directed via an optical fiber system; (c) a lens system transmitting the image from the objective lens to the viewer, typically a relay lens system in the case of rigid endoscopes or a bundle of fiberoptics in the case of a fiberscope; (d) an eyepiece. Modern instruments may be videoscopes, with no eyepiece, a camera transmits image to a screen for image capture; and (e) an additional channel to allow entry of medical instruments or manipulators.

As used herein, “flexible endoscope” refers to an endoscope that includes a flexible tube.

As used herein, “flexible endoscope washer disinfector device” or “washer disinfector device” refers to an apparatus or machine employed to wash a medical device, such as a flexible endoscope or colonoscope. Such an apparatus or machine can also disinfect the medical device, as well as optionally dry and optionally store the medical device. Suitable apparatus or machines that can wash and disinfect the medical device include, e.g., Medivators Advantage Plus™ Automated Endoscope Reprocessor (AER), Medivators Advantage Plus™ Pass-Thru AER, Medivators Scope Buddy™ Endoscope Flushing Aid, Medivators Scope Buddy™ Plus Endoscope Flushing Aid, Olympus OER-PRO® AER, Getinge ED-Flow AER, Getinge ED900 AER, Steris SYSTEM 1® and SYSTEM 1E® Endo Liquid Chemical Sterilant Processing System.

As used herein, “clean,” “cleaning.” “wash,” or “washing” refers to the process of freeing a substrate from foreign or extraneous matter; the process of removing foreign or extraneous matter from a substrate (e.g., medical device).

As used herein, “disinfect” or “disinfecting” refers to the process of destroying, removing, killing and/or inhibiting the action of microorganisms located on a substrate (e.g., medical device).

As used herein, “dry” or “drying” refers to the process of removing moisture from a substrate (e.g., medical device). The process can be carried out, e.g., employing heat (elevated temperature).

As used herein, “store” or “storing” refers to the process of housing a substrate (e.g., medical device) for future use.

The embodiments described herein relate to methods for conditioning medical equipment to be processed (cleaning and disinfection) of said equipment, and to apparatus’ for use in such methods. In particular, embodiments relate to methods and apparatus’ for conditioning flexible medical endoscopes after use but before disinfection or sterilization, following processing of said endoscope to a state of high level disinfection.

The term “disinfection” is used herein in preference to the term “sterility” since the latter implies the complete absence of pathogenic organisms, which in practice is rarely, if ever, achievable. It is to be appreciated however that the ultimate aim of disinfecting medical equipment is indeed to get as close to absolute sterility as is practicable. The term “conditioning” is used herein to refer to a method of maintaining the disinfection of medical equipment following processing thereof to a state of high level disinfection.

The present embodiments have been developed in connection with the processing and storage of flexible medical endoscopes, and therefore will be described herein with particular emphasis on this application. It is envisaged however, that the methods described herein may be applied to the processing and storage of substantially all types of medical, surgical, dental and veterinary equipment, apparatus, and instruments, especially those with lumens.

After use in an endoscopic procedure, flexible medical endoscopes are usually subjected to “processing”, consisting of rigorous manual cleaning followed by placing the endoscope in an Automated Endoscope Re-processor (AER) which effects a further cleaning and disinfecting procedure to bring the endoscope to a High Level Disinfection Status (HLDS). The endoscope is then stored in a clean environment. However, there are times when the operator or the operator’s assistant do not have opportunity to clean the device immediately after use. The present embodiments are useful in such situations, maintaining a moist/wet environment for the device so as to not have the soil adhere tenaciously to the device. In practicality, the operator generally will spray the soiled device with the foam and then cover or store the treated device in a tray or container that can be sealed with a top or a shrink wrap type material. However, the foam compositions of the invention will work equally as well after application if the medical device is not covered in a sealed container and simply left in the open in the container.

Under normal storage conditions, the degree of disinfection of the endoscope can only be maintained at an acceptable level for a relatively short period, usually about 3 hours. This is due to the multiplication of residual pathogens which may remain on the endoscope after disinfection, or which may be present in the atmosphere. If the endoscope is not used in a further endoscopic procedure within this time, then further processing will be necessary prior to its next use. Frequent and repeated processing is undesirable, since it reduces the availability of the endoscope for endoscopic procedures, while increasing the operating costs, due to the need for cleaning and disinfectant materials and the operation of cleaning equipment. Furthermore, repeated processing reduces the lifetime of the endoscope due to wear and tear.

The loss of HLDS over the 3 hour storage period is due to the inability of the AER completely to dry the internal channels of the endoscope, due to the small internal diameter of these channels. The residual moisture within the channels provides an environment in which micro-organisms can quickly multiply.

The compositions described herein can be used on medical devices, such as flexible endoscopes, to prevent or delay adhesion (due to drying) of at least one of soil, blood, protein, carbohydrate, bodily fluid, and fecal matter onto the medical device.

The term "microbe." "microbes" "microorganism," or "micro-organism" refers to a microscopic organism that comprises either a single cell (unicellular), cell clusters, or no cell at all (acellular). Microorganisms are very diverse; they include bacteria, fungi, archaca, and protists; microscopic plants (green algae); and animals such as plankton and the planarian. Some microbiologists also include viruses, but others consider these as non-living. Most microorganisms are unicellular (single-celled), but this is not universal, since some multicellular organisms are microscopic, while some unicellular protists and bacteria, like *Thiomargarita namibiensis*, are macroscopic and visible to the naked eye.

The term "virus" refers to a small infectious agent that can replicate only inside the living cells of organisms. Virus particles (known as virions) consist of two or three parts: the genetic material made from either DNA or RNA, long molecules that carry genetic information; a protein coat that protects these genes; and in some cases an envelope of lipids that surrounds the protein coat when they are outside a cell. The shapes of viruses range from simple helical and icosahedral forms to more complex structures. The average virus is about one one-hundredth the size of the average bacterium. An enormous variety of genomic structures can be seen among viral species; as a group they contain more structural genomic diversity than plants, animals, archaca, or bacteria. There are millions of different types of viruses, although only about 5,000 of them have been described in detail. A virus has either DNA or RNA genes and is called a DNA virus or a RNA virus respectively. The vast majority of viruses have RNA genomes. Plant viruses tend to have single-stranded RNA genomes and bacteriophages tend to have double-stranded DNA genomes.

The term "fungi" or "fungus" refers to a large and diverse group of eucaryotic microorganisms whose cells contain a nucleus, vacuoles, and mitochondria. Fungi include algae, molds, yeasts, mushrooms, and slime molds. Sec, Biology of Microorganisms, T. Brock and M. Madigan, 6th Ed., 1991, Prentice Hill (Englewood Cliffs, N.J.). Exemplary fungi include Ascomycetes (e.g., *Neurospora, Saccharomyces*, Morchella), Basidiomycetes (e.g., *Amanita, Agaricus*), Zygomycetes (e.g., *Mucor, Rhizopus*), Oomycetes (e.g., Allomyces), and Deuteromycetes (e.g., *Penicillium, Aspergillus*).

The term "mold" refers to a filamentous fungus, generally a circular colony that may be cottony, wooly, etc. or glabrous, but with filaments not organized into large fruiting bodies, such as mushrooms. Sec, e.g., Stedman's Medical Dictionary, 25th Ed., Williams & Wilkins, 1990 (Baltimore, Md.). One exemplary mold is the Basidiomycetes called wood-rotting fungi. Two types of wood-rotting fungi are the white rot and the brown rot. An ecological activity of many fungi, especially members of the Basidiomycetes is the decomposition of wood, paper, cloth, and other products derived from natural sources. Basidiomycetes that attack these products are able to utilize cellulose or lignin as carbon and energy sources. Lignin is a complex polymer in which the building blocks are phenolic compounds. It is an important constituent of woody plants. The decomposition of lignin in nature occurs almost exclusively through the agency of these wood-rotting fungi. Brown rot attacks and decomposes the cellulose and the lignin is left unchanged. White rot attacks and decomposes both cellulose and lignin. Sec, Biology of Microorganisms, T. Brock and M. Madigan, 6th Ed., 1991, Prentice Hill (Englewood Cliffs, N.J.).

The term "slime molds" refers to nonphototrophic eucaryotic microorganisms that have some similarity to both fungi and protozoa. The slime molds can be divided into two groups, the cellular slime molds, whose vegetative forms are composed of single amoeba like cells, and the acellular slime molds, whose vegative forms are naked masses of protoplasms of indefinite size and shape called plasmodia. Slime molds live primarily on decaying plant matter, such as wood, paper, and cloth. Sec, Biology of Microorganisms, T. Brock and M. Madigan, 6th Ed., 1991, Prentice Hill (Englewood Cliffs, N.J.).

The term "algae" refers to a large and diverse assemblage of eucaryotic organisms that contain chlorophyll and carry out oxygenic photosynthesis. Sec, Biology of Microorganisms, T. Brock and M. Madigan, 6th Ed., 1991, Prentice Hill (Englewood Cliffs, N.J.). Exemplary algae include Green Algae (e.g., *Chlamydomonas*), Euglenids (e.g., *Euglena*), Golden Brown Algae (e.g., Navicula), Brown Algae (e.g., *Laminaria*), Dinoflagellates (e.g., Gonyaulax), and Red Algae (e.g., Polisiphonia).

The term "yeast" refers to unicellular fungi, most of which are classified with the Ascomytes. See, Biology of Microorganisms, T. Brock and M. Madigan, 6th Ed., 1991, Prentice Hill (Englewood Cliffs, N.J.).

The term "mushrooms" refer to filamentous fungi that are typically from large structures called fruiting bodies, the edible part of the mushroom. See, Biology of Microorganisms, T. Brock and M. Madigan, 6th Ed., 1991, Prentice Hill (Englewood Cliffs, N.J.).

The term "bacterium" or "bacteria" refers to a large domain of prokaryotic microorganisms. Typically a few micrometers in length, bacteria have a wide range of shapes, ranging from spheres to rods and spirals. Bacteria are present in most habitats on Earth, growing in soil, acidic hot springs, radioactive waste, water, and deep in the Earth's crust, as well as in organic matter and the live bodies of plants and animals, providing outstanding examples of mutualism in the digestive tracts of humans, termites and cockroaches. There are typically about 40 million bacterial cells in a gram of soil and a million bacterial cells in a milliliter of fresh water; in all, there are approximately five nonillion ($5\times10^{30}$) bacteria on Earth, forming a biomass that exceeds that of all plants and animals. Most bacteria have not been characterized, and only about half of the phyla of bacteria have species that can be grown in the laboratory.

The term "*P. aeruginosa*" or "*Pseudomonas aeruginosa*" refers to a common bacterium that can cause disease in animals, including humans. It is found in soil, water, skin flora, and most man-made environments throughout the world. It thrives not only in normal atmospheres, but also in hypoxic atmospheres, and has, thus, colonized many natural and artificial environments. It uses a wide range of organic material for food; in animals, the versatility enables the organism to infect damaged tissues or those with reduced immunity. The symptoms of such infections are generalized inflammation and sepsis. If such colonizations occur in critical body organs, such as the lungs, the urinary tract, and kidneys, the results can be fatal. Because it thrives on most surfaces, this bacterium is also found on and in medical equipment, including catheters, causing cross-infections in hospitals and clinics. It is implicated in hot-tub rash.

The term "*S. aureus*" or "*Staphylococcus aureus*" refers to a facultative anaerobic Gram-positive bacterium. It is frequently found as part of the normal skin flora on the skin and nasal passages. It is estimated that 20% of the human population are long-term carriers of *S. aureus. S. aureus* is the most common species of staphylococci to cause Staph infections. The reasons *S. aureus* is a successful pathogen are a combination host and bacterial immuno-evasive strategies. One of these strategies is the production of carotenoid pigment staphyloxanthin which is responsible for the characteristic golden color of *S. aureus* colonies. This pigment acts as a virulence factor, primarily being a bacterial antioxidant which helps the microbe evade the host's immune system in the form of reactive oxygen species which the host uses to kill pathogens.

*S. aureus* can cause a range of illnesses from minor skin infections, such as pimples, impetigo, boils (furuncles), cellulitis folliculitis, carbuncles, scalded skin syndrome, and abscesses, to life-threatening diseases such as pneumonia, meningitis, osteomyelitis, endocarditis, toxic shock syndrome (TSS), bacteremia, and sepsis. Its incidence is from skin, soft tissue, respiratory, bone, joint, endovascular to wound infections. It is still one of the five most common causes of nosocomial infections, often causing postsurgical wound infections. Each year, some 500,000 patients in American hospitals contract a staphylococcal infection.

Methicillin-resistant *S. aureus*, abbreviated MRSA and often pronounced "mer-sa" (in North America), is one of a number of greatly-feared strains of *S. aureus* which have become resistant to most antibiotics. MRSA strains are most often found associated with institutions such as hospitals, but are becoming increasingly prevalent in community-acquired infections.

The term "*E. hirae*" or "*Enterococcus hirae*" refers to a species of *Enterococcus.*

The term "*M. terrae*" or "*Mycobacterium terrae*" refers to a slow-growing species of *Mycobacterium*. It is an ungrouped member of the third Runyon (nonchromatogenic mycobacteria). It is known to cause serious skin infections, which are relatively resistant to antibiotic therapy.

The term "*Mycobacterium avium* complex." "*M. avium* complex" or "MAC" refers to a group of genetically related bacteria belonging to the genus *Mycobacterium*. It includes *Mycobacterium avium* and *Mycobacterium intracellulare.*

The term "*M. avium*" or "*Mycobacterium avium*" refers to a species of *Mycobacterium.*

The term "*M. intracellulare*" or "*Mycobacterium intracellulare*" refers to a species of *Mycobacterium.*

The term "room temperature" as used herein refers to a temperature of about 15° C. to 28° C.

The foamable compositions disclosed herein include a polyoxyethylene-polyoxypropylene glycol; an ethoxylated C16-C18 alcohol; a C16-C18 alkyl alcohol; a chelator; an alpha hydroxy acid or a beta hydroxy acid; an alkali metal hydroxide; a C8/C10 alkyl polyglycoside; an alkyoxylated alcohol; a quaternary ammonium compound; a glycol ether and water.

The term "polyoxyethylene-polyoxypropylene glycol" is recognized in the art and refers to an organic compound with the formula $HO\cdot(C_2H_4O)_m\cdot(C_3H_6O)_n\cdot H$ and CAS registry number of 9003-11-6. Suitable commercial products, for example but not limited to, include KOLLISOV® P124. PLURONIC® L44, or Poloxamer 124. The compositions disclosed herein can include this ingredient from about 4% to about 7% by weight.

Poloxamers are nonionic triblock copolymers composed of a central hydrophobic chain of polyoxypropylene (poly (propylene oxide)) flanked by two hydrophilic chains of polyoxyethylene (poly(ethylene oxide)). Poloxamers are also known by the trade name Pluronics®.

Because the lengths of the polymer blocks can be customized, many different poloxamers exist, that have slightly different properties. For the generic term "poloxamer," these copolymers are commonly named with the letter "P" (for poloxamer) followed by three digits, the first two digits "×" (times) 100 give the approximate molecular mass of the polyoxypropylene core, and the last digit×10 gives the percentage polyoxyethylene content (e.g., P407=Poloxamer with a polyoxypropylene molecular mass of 4,000 g/mol and a 70% polyoxyethylene content). For the Pluronic® tradename, coding of these copolymers starts with a letter to define its physical form at room temperature (L=liquid, P=paste, F=flake (solid)) followed by two or three digits. The first digit (two digits in a three-digit number) in the numerical designation, multiplied by 300, indicates the approximate molecular weight of the hydrophobe; and the last digit×10 gives the percentage polyoxyethylene content (e.g., L61=Pluronic with a polyoxypropylene molecular mass of 1,800 g/mol and a 10% polyoxyethylene content). In the example given, poloxamer 181 (P181)=Pluronic L61.

The term "ethoxylated C16-C18 alcohol" is recognized in the art and refers to alcohols C16-18 that are ethoxylated, having CAS registry number 68439-49-6 and are also known as polyoxyethylene (30) cetyl/stearyl ether or ceteareth-20, or polyoxyl 20 cetostearyl ether. Further suitable ethoxylated alcohols include cetearyl alcohol/ceteareth-20 mixtures, CAS registry number 67762-27-0, a C16-18 alkyl alcohol, also known as cetostearyl alcohol. The compositions disclosed herein can include this ingredient from about 0.15% by weight to about 0.35% by weight, e.g., from about 0.22% by weight to about 0.28% by weight, e.g., 0.25% by weight.

The term "C16-C18 alkyl alcohol" is recognized in the art and refers to cetostearyl alcohol, cetearyl alcohol, cetylstearyl or cetyl/stearyl alcohol which is a mixture of fatty alcohols, consisting predominantly of cetyl and stearyl alcohols and is classified as a fatty alcohol having a CAS registry number of 67762-27-0. The compositions disclosed herein can include this ingredient from about 0.4% by weight to about 0.6% by weight, e.g., 0.5% by weight.

The term "chelator" is recognized in the art and refers to a compound that can bind to a metal atom. Suitable chelators include, but are not limited to, ethylene diamine tetraacetic acid (EDTA), EDTA tetrasodium salt, DHEG, diethylenetriamine penta acetic acid (DTPA), DTPA-OH, EDDA, EDDP, EDDPO, EDTA-OH, EDTPO, EGTA, HBED, HDTA, HIDA, IDA, methyl-EDTA, NTA, NTP, NTPO, O-Bistren, TTHA, EGTA, DMSA, fumaric acid and malic acid. The compositions disclosed herein can include this ingredient from about 0.03% by weight to about 0.06% by weight, e.g., 0.039% to about 0.058% by weight.

The term "alpha hydroxy acid" is recognized in the art and refers to compounds that have a hydroxyl group on a carbon adjacent to a carboxylic acid group. Suitable alpha hydroxy acids include, but are not limited to, lactic acid, glycolic acid, malic acid, mandelic acid, tartronic acid, threonic acid, acetolactic acid and tartaric acid. The compositions disclosed herein can include this ingredient from about 0.05% by weight to about 0.09% by weight, e.g., 0.055% by weight to about 0.88% by weight.

The term "beta hydroxy acid" is recognized in the art and refers to compounds that have a hydroxyl group on a carbon that is 2 carbons from a carboxylic acid group. Suitable beta hydroxy acids include, but are not limited to, propanoic acid, beta hydroxybutyric acid, beta hydroxyl beta methyl butyric acid, carnitine, salicylic acid, tropic acid, trethocanic acid, etc. The compositions disclosed herein can include this ingredient from about 0.05% by weight to about 0.09% by weight, e.g., 0.055% by weight to about 0.88% by weight.

The term "alkali metal hydroxide" is recognized in the art and refers to hydroxides of sodium, lithium, potassium, rubidium cesium and francium. The compositions disclosed herein can include this ingredient from about 0.015% by weight to about 0.03% by weight, e.g., from about 0.02% by weight to about 0.025% by weight.

The term "C8/C10 alkyl polyglycoside" is recognized in the art and refers to a class of non-ionic surfactants widely used in a variety of cosmetic, household, and industrial applications. Biodegradable and plant-derived from sugars, these surfactants are glucose derivatives, and fatty alcohols. The raw materials are typically starch and fat, and the final products are typically complex mixtures of compounds with different sugars comprising the hydrophilic end and alkyl groups of variable length comprising the hydrophobic end. When derived from glucose, they are known as alkyl polyglucosides and are also known as "APGs". The alkyl portion of the APG is a mixture of octyl and decyl groups having a CAS registry number 68515-73-1 and is also known as caprylyl/capryl oligoglucoside. The compositions disclosed herein can include this ingredient from about 0.9% by weight to about 1.1% by weight, e.g., about 0.95% by weight.

The term "alkyoxylated alcohol" as used herein is recognized in the art and refers to a polyoxyethylene (25) polyoxypropylene (25) lauryl ether, also known as poly(propylene oxide, ethylene oxide) lauryl ether, having a CAS registry number of 37311-00-5 and is commercially available as a mixture with C8/C10 alkyl polyglycoside, known as Alkadet 20. The compositions disclosed herein can include this ingredient from about 0.09% by weight to about 0.2% by weight, e.g., 0.095% by weight to about 0.15% by weight.

The term "quaternary ammonium compound" is recognized in the art which is a cationic surfactant and is often referred to as a "QAC". Suitable QACs include, for example, but are not limited to, benzalkonium chloride (BAC), alkyl dimethyl benzyl ammonium chloride (ADBAC), alkyl dimethyl ethylbenzyl ammonium chloride, dialkyl dimethyl ammonium chloride, benzethonium chloride (BZT), N,N-bis-(3-aminopropyl) dodecylamine, chlorhexidine gluconate, PHMB (polyhexamethylene biguanide), salt of a biguanide, a substituted biguanide derivative, cetyl trimethylammonium bromide (CTAB), hexadecyl trimethyl ammonium bromide, cetyl trimethylammonium chloride (CTAC), cetylpyridinium chloride (CPC), polyethoxylated tallow amine (POEA), 5-Bromo-5-nitro-1,3-dioxane, dimethyldioctadecylammonium chloride and dioctadecyldimethylammonium bromide (DODAB), an organic salt of a quaternary ammonium containing compound or an inorganic salt of a quaternary ammonium containing compound or mixtures thereof. The compositions disclosed herein can include this ingredient from about 0.15% by weight to about 0.35% by weight, e.g., from about 0.2% by weight to about 0.3% by weight.

The term "glycol ether" is recognized in the art and refers to a group of solvents based on alkyl ethers of ethylene glycol or propylene glycol. Suitable glycol ethers include, but are not limited to, ethylene glycol monoethyl ether, ethylene glycol monopropyl ether, ethylene glycol monoisopropyl ether and diethylene glycol monomethyl ether with a CAS registry number of 111-77-3. The compositions disclosed herein can include this ingredient from about 0.15% by weight to about 0.35% by weight, e.g., from about 0.2% by weight to about 0.3% by weight.

Alternatively, the glycol ether could be replaced with another suitable solvent, such as an alkyl glycol, such as those recognized in the art and include, but are not limited to, ethylene glycol, propylene glycol, triethylene glycol, etc.

The compositions disclosed herein can further include a fragrance, such as those recognized in the art, including but not limited to perfume fresh cotton EPA, etc. The compositions disclosed herein can include this ingredient from about 0.0003% by weight to about 0.00065% by weight, e.g., 0.0004% by weight to about 0.0006% by weight.

The compositions disclosed herein can also include a dye, such as those recognized in the art, including but not limited to FD&C blue number 1. The compositions disclosed herein can include this ingredient from about 0.0003% by weight to about 0.00045% by weight, e.g., 0.00035% by weight to about 0.0004% by weight The compositions disclosed herein can also include an antioxidant, such as D,L-alpha tocopherol.

In addition, the foamable compositions described herein can also contain other ingredients which can further improve the desired properties. The foamable compositions disclosed herein can include one or more substances from the group of enzymes, antimicrobial active ingredients, germicides, fungicides, antioxidants, preservatives, and/or corrosion inhibitors.

In one embodiment, the foamable compositions can include at least one enzyme. The enzyme can be any enzyme known in the art including, but not limited to, proteases, amylases, lipases, cellulases, hemicellulases, mannanases, pectin-cleaving enzymes, tannases, xylanases, xanthanases, beta-glucosidases, carrageenases, perhydrolases, oxidases, oxidoreductases and mixtures thereof.

The components of the compositions are mixed together at ambient temperature and can be used after dissolution/mixing is complete. Generally, the components are mixed together at about 70° C. until dissolution is complete and then cooled to ambient temperature before use.

The compositions are generally placed into a spray bottle that mixes the liquid composition with air as it is passed through the spray nozzle thus forming a foam. The foam is sprayed liberally onto a soiled medical device and can be left for later disinfection, cleaning and sterilization. Suitable spray bottles are available from commercial suppliers and are readily available.

The foamed compositions described herein retain their foam characteristics for at least 24 hours, preferably 48 hours and most preferably at least 72 hours at ambient temperatures. The foam retention should be at least 60% (remainder drainage), or 70% or 80% or greater.

The foamed compositions described herein prevents or reduces the formation of biofilm on the surface of the soiled device. Treatment of the soiled device with the compositions described herein helps to prevent and/or eliminate biofilm formation until the soiled device can be cleaned appropriately. Therefore, the foamed compositions described herein are beneficial in providing the operator with a period of time of up to 72 hours to clean the soiled device without concern that an intractable biofilm may form on the device's surface.

The following paragraphs enumerated consecutively from 1 through 15 provide for various aspects of the present invention. In one embodiment, in a first paragraph (1), the present invention provides a foamable composition comprising:

a polyoxyethylene-polyoxypropylene glycol;
an ethoxylated C16-C18 alcohol;
a C16-C18 alkyl alcohol;
a chelator;
an alpha hydroxy acid or a beta hydroxyl acid;
an alkali metal hydroxide;
a C8/C10 alkyl polyglycoside;
an alkyoxylated alcohol;
a quaternary ammonium compound;
a glycol ether; and
water.

2. The foamable composition according to paragraph 1, wherein the foamable composition does not include a propellant.

3. The foamable composition according to either paragraph 1 or paragraph 2, wherein the polyoxyethylene-polyoxypropylene glycol has an average molecular weight of about 2090 to about 2360.

4. The foamable composition according to any of paragraphs 1 through 3, further comprising an antioxidant.

5. The foamable composition according to paragraph 4, wherein the antioxidant comprises D,L-alpha tocopherol.

6. The foamable composition according to any of paragraphs 1 through 5, wherein the chelator is ethylene diamine tetraacetic acid tetrasodium salt.

7. The foamable composition according to any of paragraphs 1 through 6, wherein the alpha hydroxyl acid is lactic acid.

8. The foamable composition according to any of paragraphs 1 through 7, wherein the alkali metal hydroxide is sodium hydroxide.

9. The foamable composition according to any of paragraphs 1 through 8, wherein the quaternary ammonium compound is benzalkonium chloride (BAC).

10. The foamable composition according to any of paragraphs 1 through 9, wherein the a glycol ether is diethylene glycol monomethyl ether.

11. The foamable composition according to any of paragraphs 1 through 10, wherein the foamable composition retains foam characteristics for at least 72 hours.

12. The foamable composition according to paragraph 11, wherein the foam composition has less than a 10% foam loss over a 72 hour period.

13. A method to treat a soiled medical device comprising the step:

applying a foamable composition of any of paragraphs 1 through 11, 16 or 17 to a soiled medical device.

14. The method according to paragraph 13, wherein the foamable composition prevents or reduces the generation of a biofilm on the soiled medical device.

15. A packaged foamable composition comprising:

a foamable composition according to any of paragraphs 1 through 11, 16 or 17;
a spray bottle; and
instructions for application of the foam unto a soiled medical device, wherein the spray bottle includes a spray dispenser that comingles air with the foamable composition to provide a foamed composition.

16. The foamable composition of any of claims 1 through 12, further comprising an enzyme.

17. The foamable composition of claim 16, wherein the enzyme comprises one or more of proteases, amylases, lipases, cellulases, hemicellulases, mannanases, pectin-cleaving enzymes, tannases, xylanases, xanthanases, beta-glucosidases, carrageenases, perhydrolases, oxidases, and/or oxidoreductases.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

5% L44 Intercept Solution:
0.50% Hetoxol D
0.25% Hetoxol CS-20
5.0% Intercept Detergent
5.0% LA4
89.25% Water 10% L44 Intercept Solution:
0.50% Hetoxol D
0.25% Hetoxol CS-20
5.0% Intercept Detergent
10% L44
84.25% Water Hetoxol D is a ceteareth-20/cetereary1 alcohol mixture.

Hetoxol CS-20 is a ceteareth-20.

Intercept Detergent comprises benzalkonium chloride, ethylenediamine tetraacetic acid tetrasodium salt, lactic acid, sodium hydroxide, Alkadet 20, diethyl glycol monoethyl ether (CAS #111-90-0), a perfume, a blue colorant and deionized water and is commercially available from Cantel, product number ML02-0106.

FIG. 1 provides pictures of foams at 0 hour, from left to right: Intercept detergent discharged from pressurized canister, Intercept detergent solution (control), L44 5% solution hand sprayed and L44 10% solution hand sprayed, all left uncovered at zero hours.

Figure 2:
FIG. 2 provides pictures of the foams in FIG. 1 at 24 hours.

FIG. 2 provides pictures of the foams in FIG. 1 at 24 hours.

Figure 3:
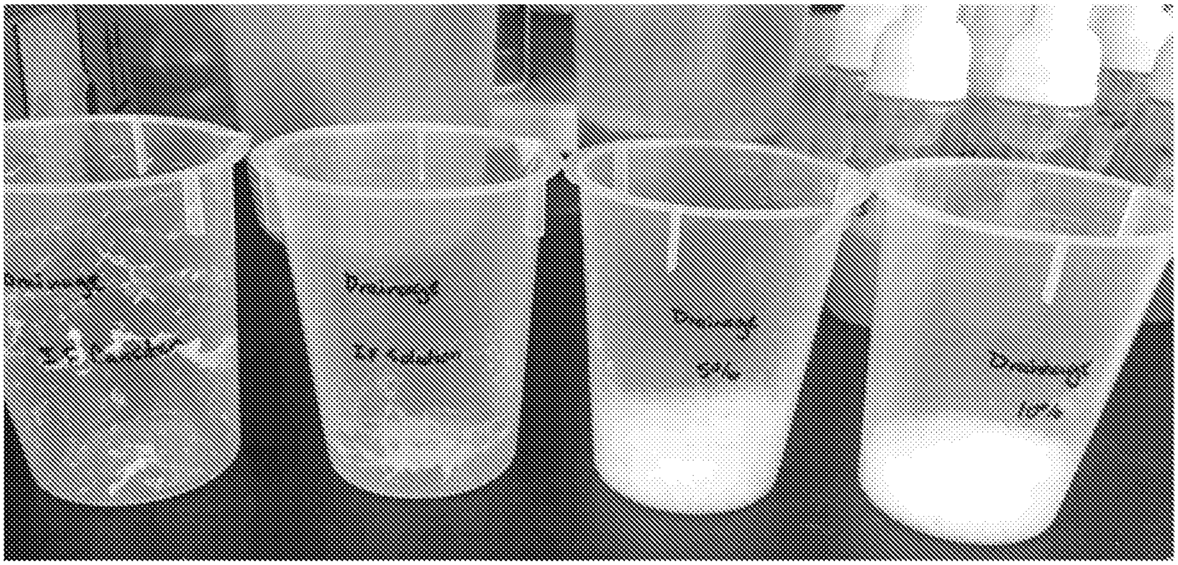
FIG. 3 provides pictures of the foams in FIG. 1 at 48 and 72 hours which remained uncovered. No change was observed between these time points. Foams at 72 hours are shown.

FIG. 3 provides pictures of the foams in FIG. 1 at 48 and 72 hours which remained uncovered. No change was observed between these time points. Foams at 72 hours are shown.

Figure 4:
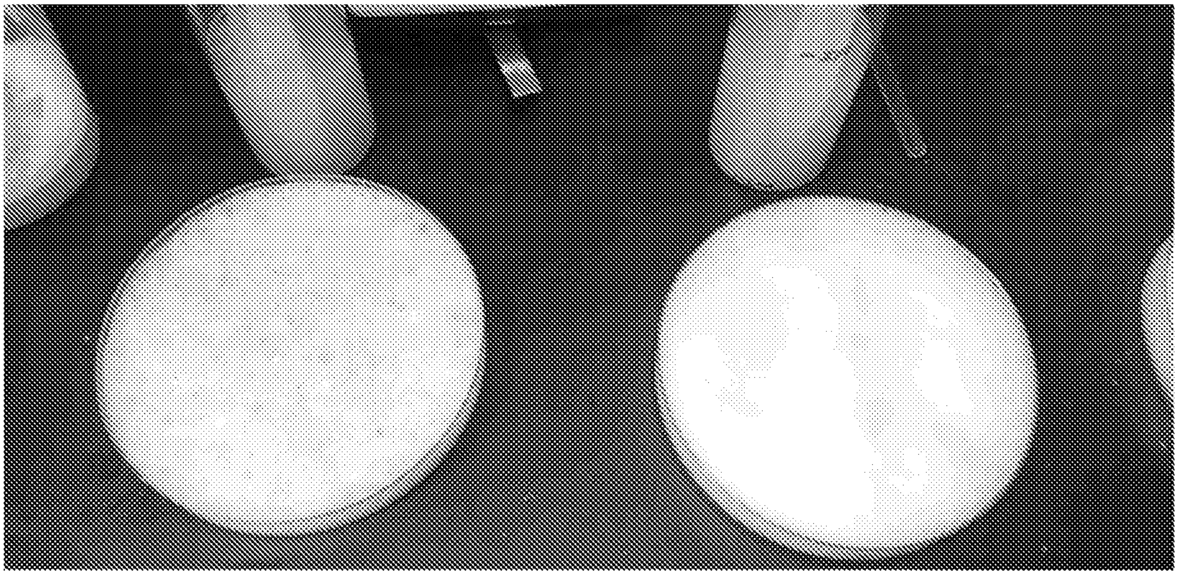
FIG. 4 provides pictures foams, Intercept detergent solution (left) and L44 5% solution (right), both hand sprayed at zero hours and left uncovered for up to 72 hours noting a larger surface area.

FIG. 4 provides pictures foams, Intercept detergent solution (left) and L44 5% solution (right), both hand sprayed at zero hours and left uncovered for up to 72 hours noting a larger surface area.

Figure 5:
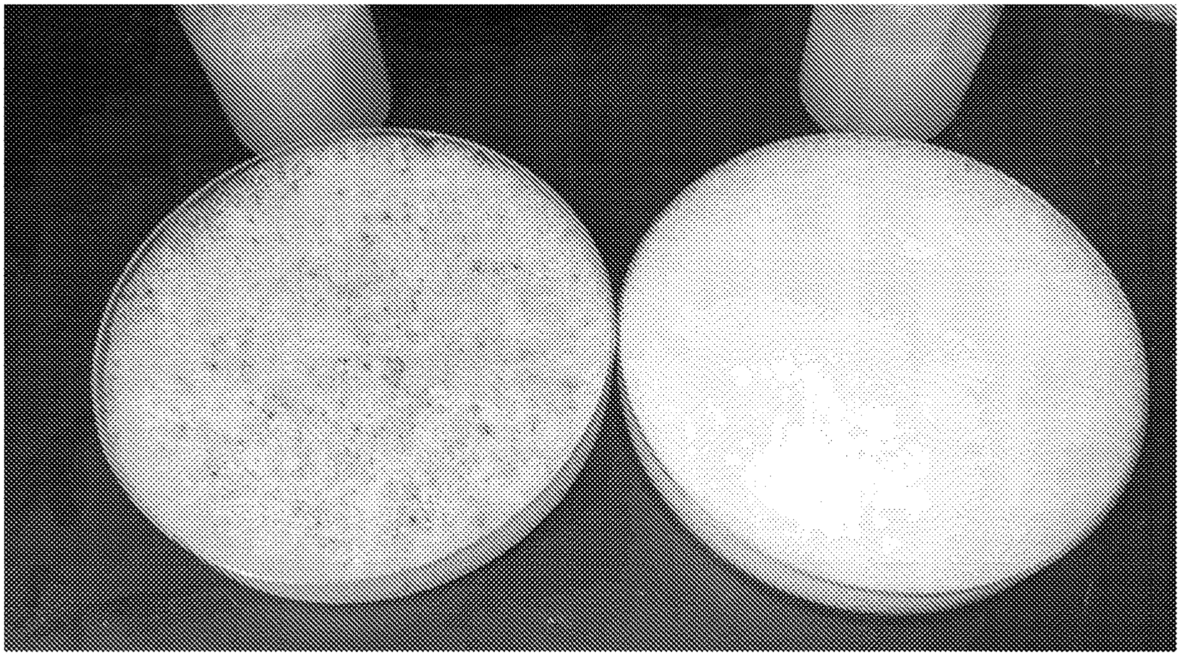
FIG. 5 provides pictures of the foams of FIG. 4 at 24 hours.

FIG. 5 provides pictures of the foams of FIG. 4 at 24 hours.

Figure 6:
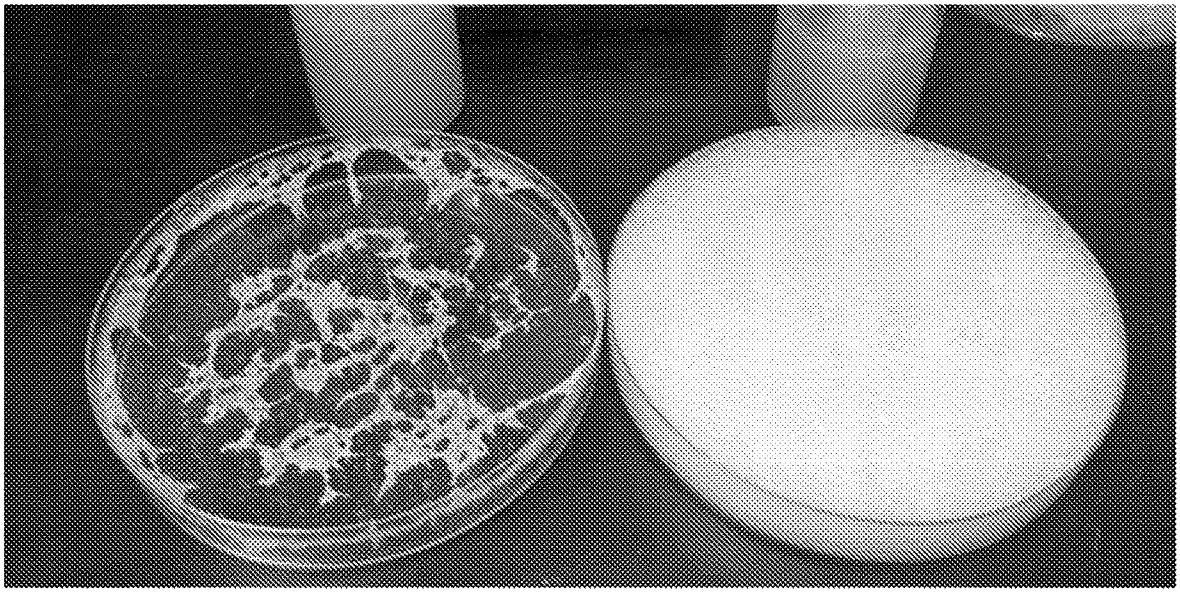
FIG. 6 provides pictures of the foams in FIG. 4 at 48 and 72 hours. No change was observed between these time points. Foams at 72 hours are shown.

FIG. 6 provides pictures of the foams in FIG. 4 at 48 and 72 hours. No change was observed between these time points. Foams at 72 hours are shown.

Figure 7:
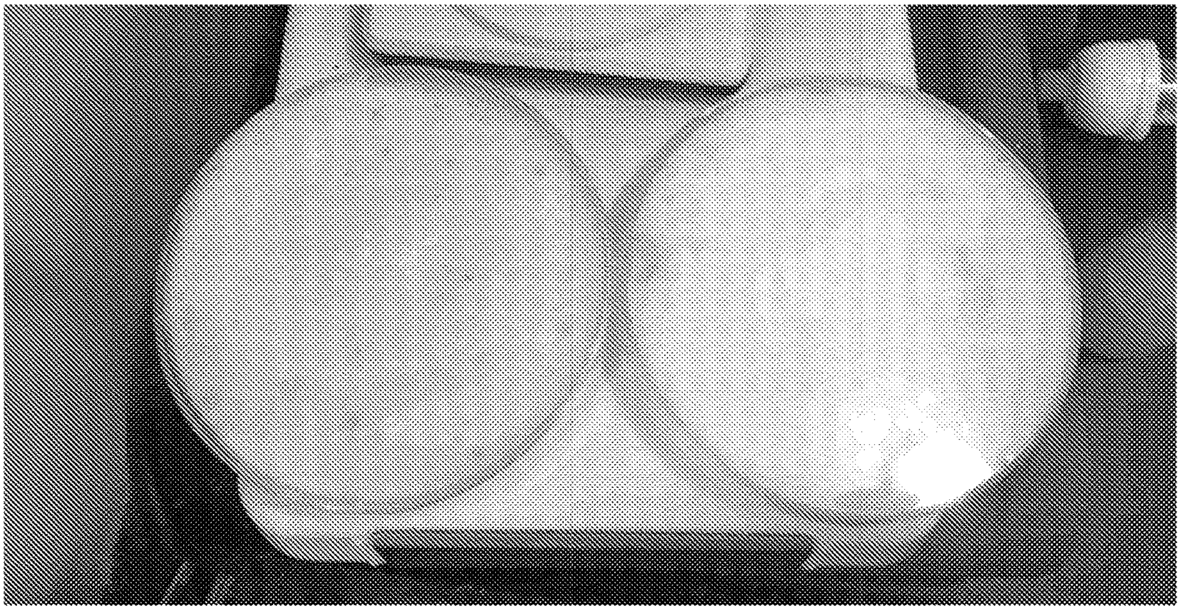
FIG. 7 provides pictures of foams at 0 hours, left (Intercept solution) and right (5% L44 solution), both hand sprayed and covered with a top.

FIG. 7 provides pictures of foams at 0 hours, left (Intercept solution) and right (5% L44 solution), both hand sprayed and covered with a top.

Figure 8:
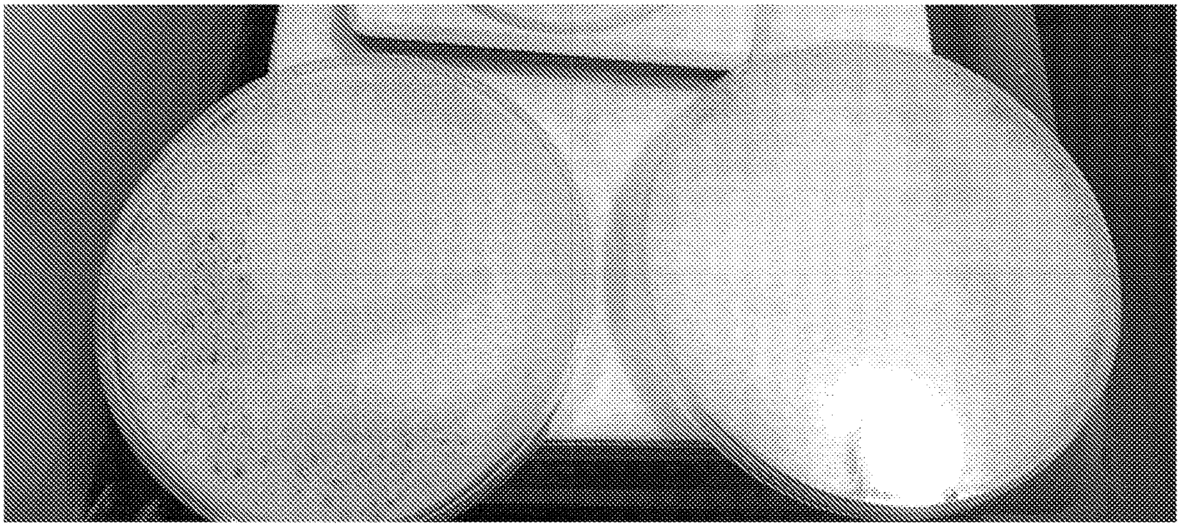
FIG. 8 provides pictures of uncovered foams from FIG. 7 after 24 hours.

FIG. 8 provides pictures of uncovered foams from FIG. 7 after 24 hours.

Figure 9:
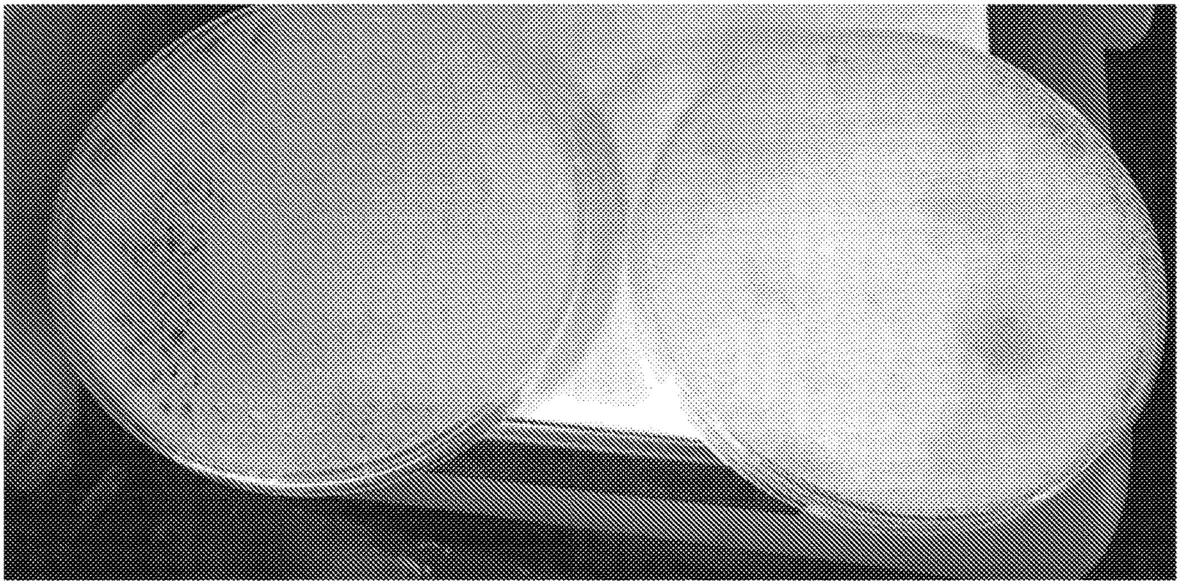
FIG. 9 provides picture of uncovered foam from FIG. 7 after 48 and 72 hours. No change was observed between these time points. Foams at 72 hours are shown.

FIG. 9 provides picture of uncovered foam from FIG. 7 after 48 and 72 hours. No change was observed between these time points. Foams at 72 hours are shown.

Figure 10:
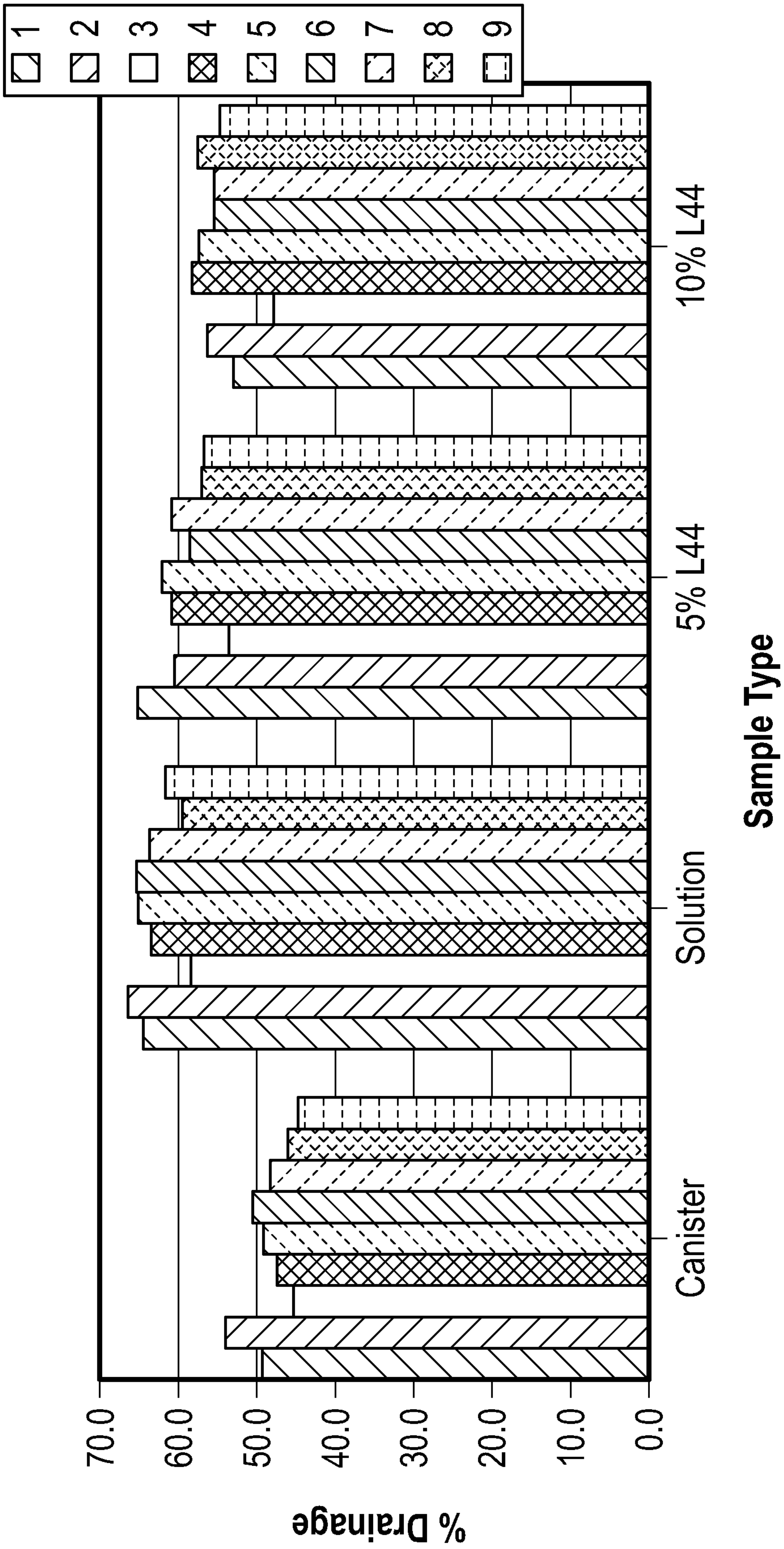
FIG. 10 depicts drainage from each of the different type of foams with a total of 9 samples per foam type, starting with an initial weight of 7 grams of foam dispensed. The solutions were Intercept detergent foamed with a propellant, Intercept detergent solution that was hand sprayed, 5% L44 solution that was hand sprayed and 10% L44 solution that was hand sprayed. Drainage is used to define the solution that parts from the bubbles or foam part of the foam. This was measured by pipetting the liquid solution out of the samples after 24 hours. The % drainage is the amount of the solution in grams divided by the total gram (initial mass) of the foam. For example, if there was a 30% drainage than the remainder 70% remains in the foam.
Figure 11:
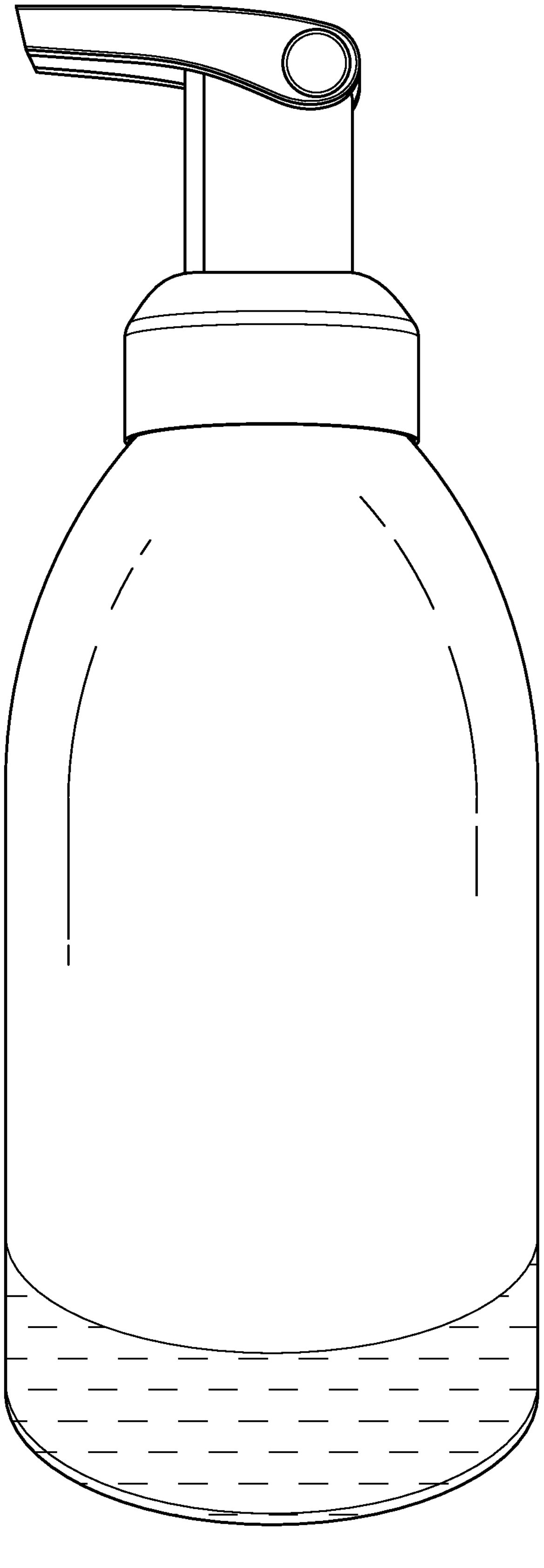
FIG. 11 depicts a suitable foam/spray bottle as used herein.

FIG. 10 depicts drainage from each of the different type of foams with a total of 9 samples per foam type, starting with an initial weight of 7 grams of foam dispensed. The solutions were Intercept detergent solution sprayed with propellant, Intercept detergent sprayed by hand, 5% L44 solution sprayed by hand and 10% L44 solution sprayed by hand. Drainage is used to define the solution that parts from the bubbles or foam part of the foam. This was measured by pipetting the liquid solution out of the samples after 24 hours. The % drainage is the amount of the solution in grams divided by the total gram (initial mass) of the foam. For example, if there was a 30% drainage than the remainder 70% remains in the foam, 40% drainage means that 60% of the foam remains. 60% foam retention is acceptable, however, higher amounts of foam retention, e.g., 65%, 70%, 75%, 80%, 85%, 90%, 95%, 97%, 98%, 99% or 100% are viewed even more favorably.

Additional L44 solutions were tested with 1% L44 and 2% L44. Results showed that the resultant 1% and 2% L44 foams started to drain within 8 hours and at 24 hours, there was only a foam skeleton which remained. These results were unacceptable.

| 1% L44 Solution: | 2% L44 Solution: |
|---|---|
| 0.50% Hetoxol D | 0.50% Hetoxol D |
| 0.25% Hetoxol CS-20 | 0.25% Hetoxol CS-20 |
| 5.0% Intercept Detergent | 5.0% Intercept Detergent |
| 1.0% L44 | 2.0% L44 |
| 93.25% Water | 92.25% Water |

When the 5% L44 Intercept Detergent Solution (detailed above) had the L44 component substituted with 5% polyethylene glycol-32 (PEG-32), 5% glycerol, or 5% cocamidopropyl betaine (CAPD), the resultant foams were not robust, uniform in overall appearance and did not meet drainage requirements and were deemed not acceptable for the purposes described herein.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A foamable composition comprising:
a polyoxyethylene-polyoxypropylene glycol;
an ethoxylated C16-C18 alcohol;
a C16-C18 alkyl alcohol;
a chelator;
an alpha hydroxy acid or a beta hydroxyl acid;
an alkali metal hydroxide;
a C8/C10 alkyl polyglycoside;
a polyoxyethylene (25) polyoxypropylene (25) lauryl ether;
a quaternary ammonium compound;
a glycol ether; and
water.

2. The foamable composition according to claim 1, wherein the foamable composition does not include a propellant.

3. The foamable composition according to claim 1, wherein the polyoxyethylene-polyoxypropylene glycol has a number average molecular weight of about 2090 to about 2360.

4. The foamable composition according to claim 1, further comprising an antioxidant.

5. The foamable composition according to claim 4, wherein the antioxidant comprises D,L-alpha tocopherol.

6. The foamable composition according to claim 1, wherein the chelator is ethylene diamine tetraacetic acid tetrasodium salt.

7. The foamable composition according to claim 1, wherein the alpha hydroxyl acid is lactic acid.

8. The foamable composition according to claim 1, wherein the alkali metal hydroxide is sodium hydroxide.

9. The foamable composition according to claim 1, wherein the quaternary ammonium compound is benzalkonium chloride (BAC).

10. The foamable composition according to claim 1, wherein the a glycol ether is diethylene glycol monomethyl ether.

11. The foamable composition according to claim 1, wherein the foamable composition retains foam characteristics for at least 72 hours.

12. The foamable composition according to claim 11, wherein the foam composition has less than a 10% foam loss over a 72 hour period.

13. A method to treat a soiled medical device comprising the step:
applying a foamable composition of claim 1 to a soiled medical device.

14. The method according to claim 13, wherein the foamable composition prevents or reduces the generation of a biofilm on the soiled medical device.

15. A packaged foamable composition comprising:
a foamable composition according to claim 1;
a spray bottle; and
instructions for application of the foam unto a soiled medical device, wherein the spray bottle includes a spray dispenser that comingles air with the foamable composition to provide a foamed composition.

16. The foamable composition of claim 1, further comprising an enzyme.

17. The foamable composition of claim 16, wherein the enzyme comprises one or more of, proteases, amylases, lipases, cellulases, hemicellulases, mannanases, pectin-cleaving enzymes, tannases, xylanases, xanthanases, beta-glucosidases, carrageenases, perhydrolases, oxidases, oxidoreductases and mixtures thereof.

* * * * *